Dec. 21, 1965    J. A. ALIBRANDI ETAL    3,224,245
CONTROL APPARATUS
Filed Oct. 11, 1961                             3 Sheets-Sheet 1

INVENTORS.
JOSEPH A. ALIBRANDI
ALAN M. CAMPBELL
BY   JOHN A. MAYNARD

Roger W. Jensen
ATTORNEY

Dec. 21, 1965  J. A. ALIBRANDI ETAL  3,224,245
CONTROL APPARATUS
Filed Oct. 11, 1961  3 Sheets-Sheet 2
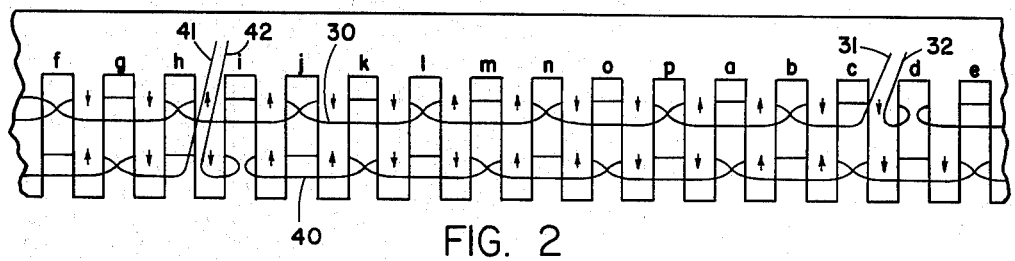
FIG. 2
FIG. 3
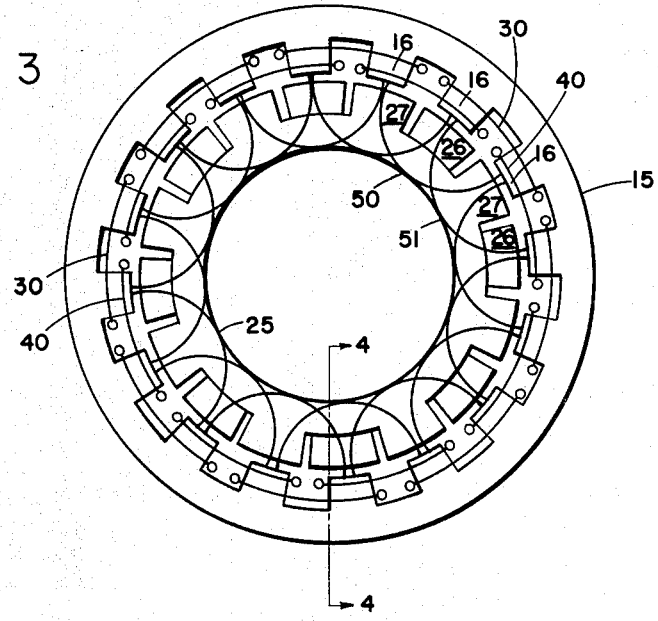
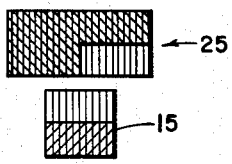
FIG. 4
INVENTORS.
JOSEPH A. ALIBRANDI
ALAN M. CAMPBELL
JOHN A. MAYNARD
BY
Roger W. Jensen
ATTORNEY Dec. 21, 1965  J. A. ALIBRANDI ETAL  3,224,245
CONTROL APPARATUS
Filed Oct. 11, 1961  3 Sheets-Sheet 3

INVENTORS.
JOSEPH A. ALIBRANDI
ALAN M. CAMPBELL
JOHN A. MAYNARD
BY
Roger W. Jensen
ATTORNEY …

United States Patent Office 3,224,245
Patented Dec. 21, 1965

3,224,245
CONTROL APPARATUS
Joseph A. Alibrandi, Watertown, Alan M. Campbell, Weston, and John A. Maynard, Winchester, Mass., assignors to Honeywell Inc., a corporation of Delaware
Filed Oct. 11, 1961, Ser. No. 144,391
1 Claim. (Cl. 73—1)

This invention relates to control apparatus and more particularly to a self-checkout device for automatically restrained apparatus. Examples of such apparatus are spring restrained instruments such as gyroscopes, accelerometers, force transducers, pressure transducers, etc.

In previous self-checking devices the teachings have been to provide a separate torquer or force producing means which can be excited to cause a displacement of the inertial element or moving member of the transducer, gyroscope or accelerometer and, thereby, produce an output at the pickoff. This output is then an indication of the operating condition of the apparatus. This addition of extra components to the apparatus adds greatly in size and cost, as well as to a decrease in reliability. It is well known in the art that the addition of more components increases the chances of a failure and therefore decreases the reliability. Also, the added components increase the errors which the self-checking device sees. Since the force producing means will have some constructional and material errors in it, it can be seen that these errors will add to the errors of the transducer.

The present invention utilizes an electromagnetic transducer, for explanatory purposes only and it should be noted that the present device would react equally as well if any of the above mentioned apparatus were utilized. This device has an inertial mass mounted within a housing and said inertial mass is automatically restrained so that it maintains a normal or null position when no accelerations or forces are applied thereto. The means automatically restraining the inertia mass may be springs or any of the other many devices known to the art, and will not be elaborated on since they form no part of the present invention.

An inductive pickoff comprised of a primary and a secondary winding is mounted contiguous with the inertial element. This inductive pickoff is so designed that the output is dependent upon the amount and direction of movement of the inertial element. In normal operation a power supply is connected to the primary winding of the inductive pickoff and some type of electrical load such as an indicator or a servo system is attached to the secondary winding. Thus, the primary winding is normally excited and the secondary winding produces a signal which is indicative of the direction and amount of movement of the inertial element.

In the present invention a switching circuit applies a voltage source across the primary winding and the secondary winding of the pickoff and simultaneously it applies a short circuit across the electrical load of the secondary winding so that the voltage source applied does not affect the load. At the same time an alternate path is supplied for the normal primary winding voltage source so that this voltage source does not affect the self-checking apparatus. Thus, with a voltage source across the primary winding and a voltage source across the secondary winding of the pickoff, the pickoff now acts as a forcer and causes a displacement of the inertial mass. After the voltage supplies have been applied to the primary and secondary windings of the pickoff for a sufficient length of time to cause a force on the inertial element, and thus a displacement of the inertial element, the switching circuit operates to remove the voltage supplies and the short circuits and to connect an indicating means across the secondary winding. This indicating means may be, for example, an oscilloscope, or it could be a controlled means such as a servo system or a manual system.

Thus, the pickoff acting as a forcer causes the inertial element to be displaced from its null position whereupon the pickoff is again used as a pickoff with an indicating means in its output circuit. As soon as the force is removed from the inertial element the automatic restraining means, or springs in this case, return the inertial element to its null position. The inertial element will not return to its null position instantaneously, but rather at a rate and in a manner which is a function of the dynamics of the instrument. As it does so, the pickoff of the electrical output will reflect the instantaneous position of the inertial element. This electrical output will reduce in magnitude as the inertial element approaches its null position and will assume a zero value when the inertial element is at its null position. If, because of the dynamic characteristics of the instrument, the inertial element oscillates about the null position, the pickoff electrical output will similarly oscillate about its zero value. If the switching means goes through several cycles at a definite frequency a trace will be produced on the oscilloscope from which can be detected the characteristics of the transducer. Thus, if a trace of the pickoff output when the transducer is working properly has been obtained a trace from the pickoff at any time thereafter may be compared to said original trace to detect any deterioration of the operation of the transducer.

Thus, a simple external self-checking apparatus has been provided which can very accurately detect any deterioration of the transducer operation. Also, it can be seen that since no additional components are added to the transducer, the reliability, operation, and cost are not impaired in any way.

It is therefore an object of this invention to provide an improved control apparatus.

Another object of the present invention is to provide an improved self-checking apparatus.

Another object of the present invention is to provide a self-checking apparatus which is inexpensive and accurate and which does not reduce reliability or operational characteristics.

Other objects of the invention will be set forth more fully in and become apparent from a reading of the following specification and claims in conjunction with the accompanying drawings in which:

FIGURE 2 is a somewhat schematic representation of the stator showing the relationship between the poles and both skein windings thereon;

FIGURE 3 is a view showing the two magnetic members positioned with respect to each other, with the windings schematically depicted on one of the members and with the fluxes represented;

FIGURE 4 is a cross-sectional view of the apparatus shown in FIGURE 3 as viewed along section lines 4—4 with the winding means not shown;

FIGURE 6 is a drawing of the voltage waveform on the output of the present device.

Figure 1:
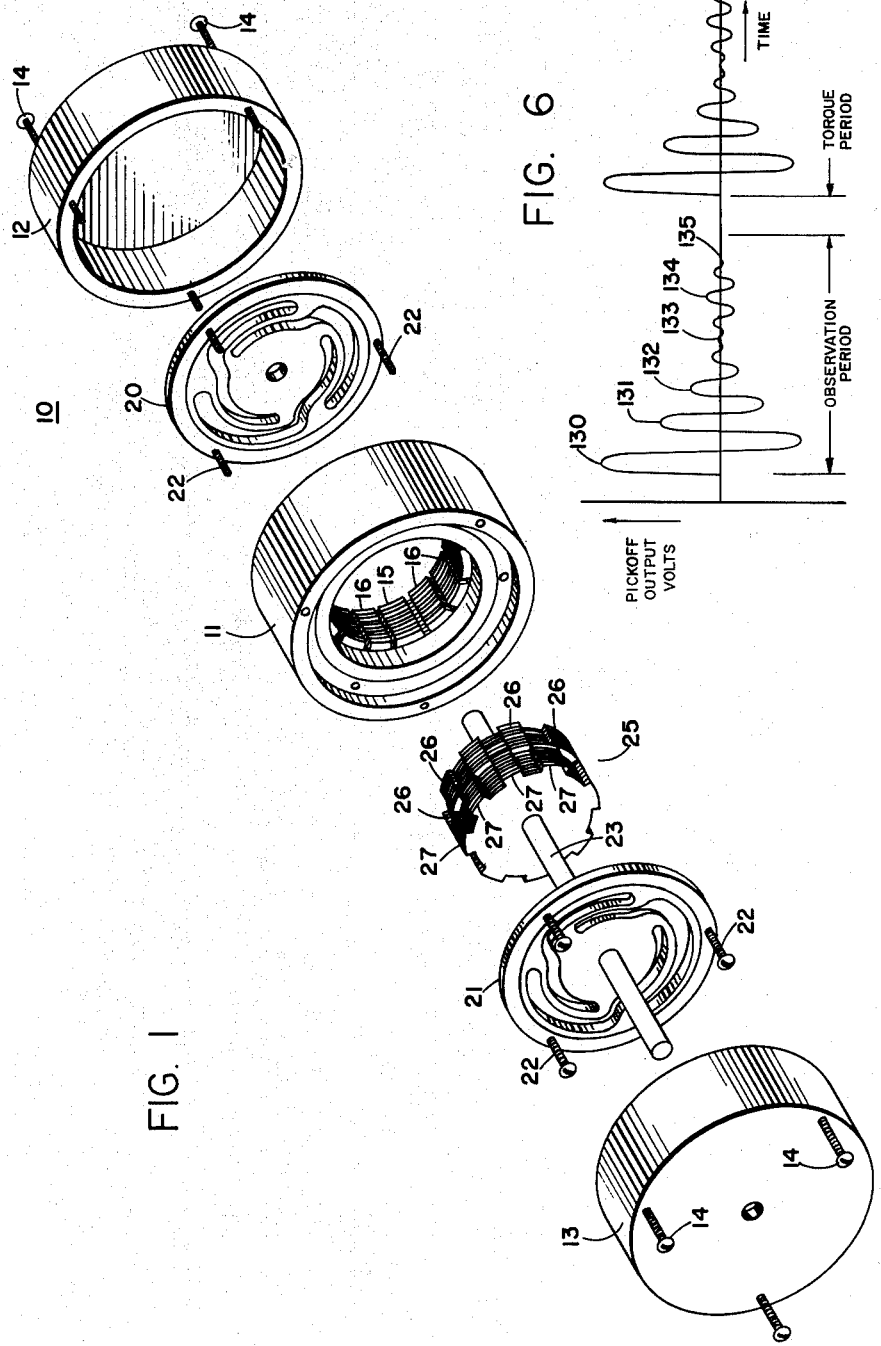
FIGURE 1 is an exploded view of an electro-magnetic transducer.

In FIGURE 1 an exploded view of an electromagnetic transducer is shown. This electromagnetic transducer is an example of a rebalancing inertial device with an inductive pickoff to which the present invention may be attached. So that the operation of the present invention may be more fully understood, a brief description of the electromagnetic transducer will precede the description of the present invention.

Referring to FIGURE 1, the reference numeral 10 generally depicts an electromagnetic transducer including a central hollow cylindrical housing element or member 11 which has cooperating end caps 12 and 13 adapted to be secured thereto by suitable means such as machine screws 14. Housing member 11 serves as a support means for a first magnetic member or stator element 15 characterized by having a plurality of salient poles 16 extending radially toward the longitudinal axis of the housing 11. Stator element 15 will be described in more detail below.

A pair of resilient diaphragms 20 and 21 are secured by suitable means such as machine screws 22 to the central housing 11 and are adapted to resiliently support a shaft 23 for rectilinear reciprocation relative to the housing 11. Rigidly connected to the shaft 23 is an armature element generally identified by the reference numeral 25 and which is characterized by having two groups of spaced apart salient poles 26 and 27. The total number of salient poles 26 and 27 is equal to the number of salient poles 16 on the stator element 15. The salient poles 26 of the armature element are displaced on one side of a right radial plane intersecting the armature element 25 while the salient poles 27 are on the opposite side of the right radial plane. The armature portion including poles 26 is angularly rotated from the portion including poles 27 by approximately one pole width so that the poles 26 and 27 are not in register. As may be seen in FIGURE 3 the armature element 25 is normally oriented relative to the stator element 15 so that each of the stator poles 16 is radially aligned with a pole of the armature element 25. Since the armature poles 26 and 27 are alternately positioned around the periphery of the armature element 25 it follows that one stator 16 will be radially aligned with an armature pole 26 while the stator poles 16 on either side of the first pole will be radially aligned with an armature pole 27. Further, at null position the armature 25 is positioned by the resilient support means relative to the stator element 15 so that the armature 25 is symmetrically located with respect to the stator element 15 as is clearly shown in FIGURE 4.

A first continuous skein winding 30 is placed on the stator 15 and is characterized by encircling a first set of pairs of adjacent poles thereon. The skein winding 30 is shown clearly in FIGURE 2 as encircling pairs of adjacent poles by being crossed over in slots $f$, $h$, $j$, $l$, $n$, $p$, $b$ and $d$. The two ends of the skein winding are shown to lie in slot $d$. Leads 31 and 32 are provided for external connections to the skein windings 30.

Referring to FIGURE 2 it will be noted that due to the crossing over of the skein winding 30 in the slots listed above that energization to the winding 30 through the connecting leads 31 and 32 will cause flux to be produced in the poles encircled which is in the same direction in both poles of each pair so encircled but it is in opposite directions for adjacent pairs.

A second continuous skein winding 40 is also placed on the stator 15 and likewise encircles pairs of adjacent poles but is displaced by one pole from the first skein winding 30. As depicted the two ends of the skein windings 40 lie in slot $i$ and it is crossed over in slots $k$, $m$, $o$, $a$, $c$, $e$ and $g$. A pair of connecting leads 41 and 42 provides a means of connecting the ends of the skein winding 40 to a suitable control apparatus.

Referring to FIGURE 3 the stator element 15 and the armature element 25 are shown in assembled relationship and the two skein windings 30 and 40 are shown somewhat schematically. Again it will be observed that the skein windings 30 and 40 each encircle adjacent pairs of poles on the stator element 15 and that the skein winding 40 is displaced by one pole from the skein winding 30. When excitation is applied to winding 30 the flux flowing in the magnetic circuit including stator poles 16 and armature poles 27 is identified by reference numeral 50 and the flux flowing in the magnetic circuit including stator poles 16 and armature 26 is identified by the reference numeral 51. It will be understood that normally the stator element 15 and armature element 25 will be laminated core structures so that the lowest reluctance for flux flow is in the plane of the laminations instead of going transverse or across the laminations.

In FIGURE 3 the armature element 25 may be assumed to be positioned symmetrically with respect to the stator element 15 as is shown in FIGURE 4. Under this orientation of elements 15 and 25 the flux 50 will be equal to the flux 51. For this condition it will be understood that each loop of the skein winding 40 has a net flux linkage of zero due to the fact that each loop encircles a pair of stator poles 16 having instantaneous opposite polarities as explained above in connection with FIGURE 2. The output from the skein winding 40 is received at leads 41 and 42 and for the null position or symmetrical position of elements 15 and 25 as shown in FIGURE 4 there will be zero net output at leads 41 and 42.

Assume a relative axial shifting between the armature element 25 and the stator element 15 so that the armature element 25 effectively moves out of the plane of the paper in FIGURE 3 toward the viewer. This will tend to decrease the reluctance in the magnetic circuits traversed by the magnetic flux 51 so that flux 51 increases in magnitude. Conversely the reluctance in the magnetic circuits transversed by magnetic flux 50 increases so as to decrease the magnitude of the flux 50. The individual loops of the skein winding 40 now each have a net flux linkage the magnitude of which is a function of the relative axial shifting between the armature element 25 and the stator element 15. Each adjacent loop will have the opposite type of flux change, that is, one loop will have flux leaving the stator and entering the armature while the adjacent loops will have a flux that is leaving the armature and entering the stator. However, due to the crossing over of the skein winding 40 as indicated the voltages induced in the respective loops aid each other so that there is a net output at leads 41 and 42.

For the other sense of relative movement between the armature element 25 and the stator element 15 away from the null signal producing position, the magnetic circuits again become unbalanced in the reverse sense of the first unbalance. Assuming armature element 25 in FIGURE 3 is moved below the plane of the paper away from the viewer, the reluctance of the circuit through which flows the flux 50 decreases so as to increase the total magnitude of the flux 50 while at the same time the reluctance of the circuit through which flows the flux 51 increases thereby decreasing the magnitude of the flux 51. This will cause a net flux to be linked by each of the loops of the skein winding 40, the net flux being of the opposite sense for the previous example given. Therefore a net output voltage will appear at the leads 41 and 42 of opposite sense to the signal which appeared for the first example given. Again the magnitude of the output voltage will be indicative of the magnitude of the relative axial displacement between the armature 25 and the stator 15. In general the electromagnetic transducer shown and described produces a signal of a sense and magnitude indicative of the sense and magnitude of relative axial displacement between the two magnetic core members.

While a particular embodiment of an electromagnetic transducer has been described it should be remembered that this transducer is simply being utilized to more clearly explain the present invention and is not intended to limit the present invention in any way. As will be apparent upon a further explanation of the present invention, many embodiments of electromagnetic transducers might be utilized by one skilled in the art.

Figure 5:
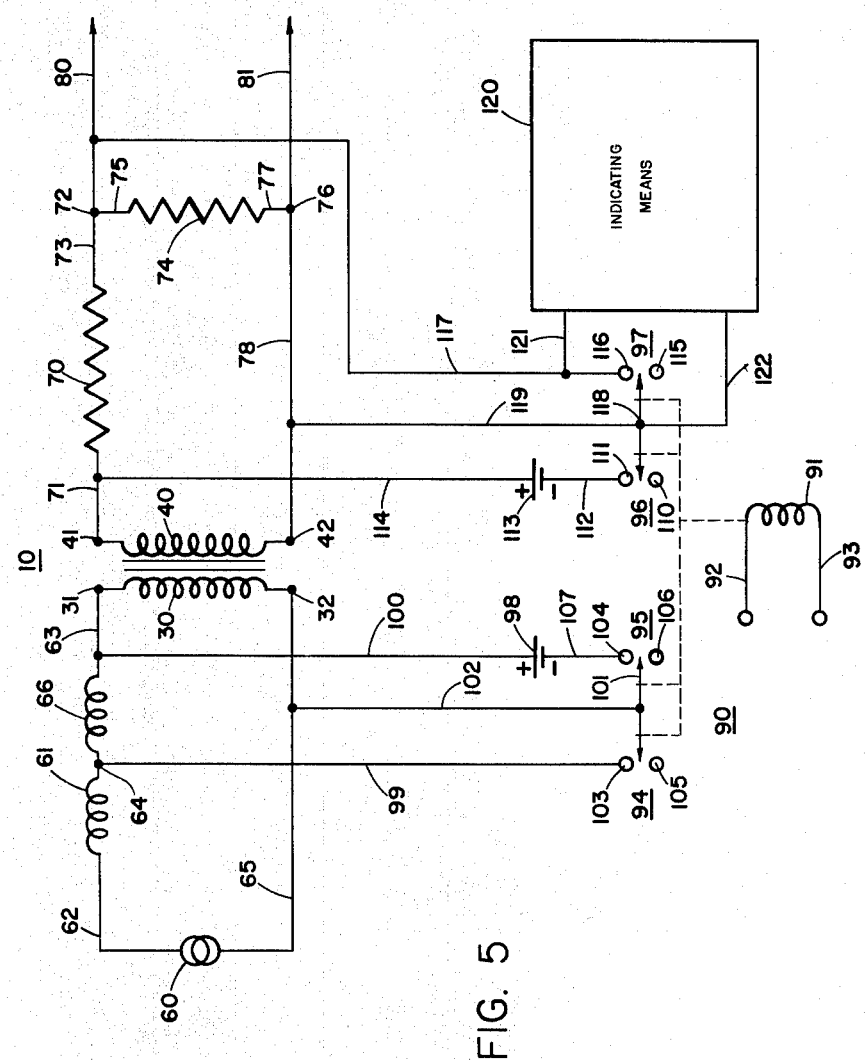
FIGURE 5 is a schematic representation of the pickoff and the self-checking apparatus attached thereto.

In FIGURE 5 the numeral 60 designates the alternating current power source which normally excites the winding 30 of transducer 10. One end of an impedance 61 is connected to supply 60 by means of a lead 62. The other end of impedance 61 is connected to a junction point 64. A second impedance 66 has one end connected to lead 31 of winding 30 by means of a lead 63 and the other end connected to junction 64. The other end of winding 30 of transducer 10, lead 32, is connected to supply 60 by means of a lead 65.

Winding 40 of transducer 10 has two leads 41 and 42 upon which the output signal of the transducer appears. Lead 41 of winding 40 is connected to one end of a resistor 70 by means of a lead 71. The other side of resistor 70 is connected to a junction point 72 by means of a lead 73. One end of a second resistor 74 is also connected to junction point 72 by means of a lead 75. The other side of resistor 74 is connected to a second junction point 76 by means of a lead 77. Lead 42 of winding 40 is also connected to junction point 76 by means of a lead 78. Resistors 70 and 74 are the usual amplitude trim resistors which appear in the output circuit of the winding 40 of transducer 10. Two leads 80 and 81 are connected to junction points 72 and 76 respectively and are adapted to be connected to the circuit in which the transducer is being used.

A relay 90 is provided which has an energizing coil 91 having two leads 92 and 93 adaptable to have applied thereto an A.C. current, and four sets of contacts 94, 95, 96 and 97. One of the contacts 105 of the pair of contacts designated 94 has no connection thereto while the other contact 103 is connected to junction point 64 by a lead 99. One contact 106 of the pair of contacts designated 95 has no connection thereto while the other contact 104 is connected to one side of a voltage supply 98 by a lead 107. The other side of voltage supply 98 is connected to lead 63 by means of a lead 100. A two-position center arm 101 which is actuated by coil 91 may be in a first position in which it connects both contacts 105 and 106 of pairs of contacts 94 and 95, respectively, which have no external connections thereto, or it may be in a second position which connects both contacts 103 and 104 of pairs of contacts 94 and 95 respectively which do have external connections thereto. In the latter case arm 101 connects contact 103 of the pair of contacts 94 and contact 104 of the pair of contacts 95 together and to lead 65 by means of a lead 102. A first contact 110 of the pair of contacts 96 has no external connection thereto. A second contact 111 of the pair of contacts 96 is connected by means of a lead 112 to a voltage supply 113. Voltage supplies 98 and 113 may be batteries or any other convenient means for supplying voltage. The other side of voltage supply 113 is connected to lead 71 by means of a lead 114. A first contact 115 of the pair of contacts 97 has no external connection thereto. A second contact 116 of the pair of contacts 97 is connected by means of a lead 117 to lead 80. A center arm 118 which is actuated by coil 91 connects contact 110 and contact 115 together in a first position and contact 111 and contact 116 together in a second position. Center arm 118 is also connected to lead 78 by a lead 119. An indicating means 120 has a lead 122 connected to center arm 118 and a lead 121 connected to lead 117. Indicating means 120 may be any indicating device such as an oscilloscope or it could be some controlled means which is utilized to control other circuits.

When coil 91 is deenergized center arm 101 is connected to contact 105 and contact 106. Since contact 105 and contact 106 have no external connections the circuit of winding 30 of transducer 10 has no external connections thereto and is, therefore, normal. That is, winding 30 is energized by voltage source 60 and leads 99, 100 and 102 are open circuited. Also, in the deenergized position of relay 90 center arm 118 is connected to contacts 110 and 115. Since contacts 110 and 115 have no external connections thereto leads 114, 117 and 119 have no external connections thereto, except for indicating means 120 which is connected across the output resistor 74 by means of leads 121 and 117, and leads 122 and 119. Thus, the winding 40 of transducer 10 has only indicating circuits connected thereto and windings 30 and 40 of transducer 10 are operating as an inductive pickoff.

When coil 91 of relay 90 is energized contact arm 101 connects contacts 103 and 104 and contact arm 118 connects contacts 111 and 116. In this position voltage supply 98 is connected across winding 30 by means of lead 100, lead 63, winding 30, lead 65, lead 102, center arm 101, contact 104, and lead 107. Simultaneously an alternate path for power supply 60 is provided through lead 62, impedance 61 to junction point 64, lead 99, contact 103, center arm 101, lead 102, and lead 65. Thus, voltage supply 98 energizes winding 30 while supply 60 in effect is shorted out through a suitable load which protects the voltage supply 60. Also in this position voltage supply 113 is placed across winding 40 by means of lead 114, lead 71, winding 40, lead 78, lead 119, center arm 118, contact 111 and lead 112. Indicating means 120 is prevented from indicating any signal at this time by a short circuit across its input consisting of lead 121, lead 117, contact 116, center arm 118, and lead 122. Also, any indicating means connected to leads 80 and 81 is prevented from receiving an output by means of a short circuit lead 117, contact 116, center arm 118, lead 119 and lead 78. Thus, a voltage supply 98 is placed across winding 30 and a voltage supply 113 is placed across winding 40 in the energized position of relay 90. The two voltage supplies across the windings of the pickoff of transducer 10 cause the pickoff to appear as a force producing means.

The manner in which energizing windings 30 and 40 produces a force upon inertial element or armature element 25 may be seen by assuming that a positive voltage is applied to lead 31 of winding 30 and a positive voltage is applied to lead 41 of winding 40. Since current flows in winding 30 from lead 31 to lead 32 a flux is set up in the pole between slots $f$ and $g$ which makes this pole appear to be a north pole. Since the pole between slots $g$ and $h$ is encompassed by the same loop of winding 30 it also appears as a north pole. The two poles between $h$ and $i$ and $i$ and $j$ slots are encompassed by a winding which is wound in the opposite direction therefore making these two poles appear as south poles. In a similar manner the next two poles are north poles and the two poles after that are south poles and, thus, the poles alternate in polarity until the pair of poles between slots $f$, $g$ and $h$ is again reached. In a similar fashion current flows through winding 40 from lead 41 to lead 42 making the pole between slots $g$ and $h$ appear as a north pole and the pole between slots $h$ and $i$ appear as a north pole since it is encompassed by the same loop. The adjacent pair of poles between slots $i$ and $j$ and $j$ and $k$ appears as south poles since they are encompassed by a loop wound in the opposite direction. Since the flux from winding 30 and the flux from winding 40 is traveling in the same direction as the pole between slots $g$ and $h$ this pole will appear as a north pole. However, the pole between slots $h$ and $i$ has flux traveling in one direction from winding 30 and in the opposite direction from winding 40, thereby creating a net flux of approximately zero. Thus, this pole will appear as having no polarity. The pole between *i* and *j* has flux flowing into the stator due to winding 30 and flux also flows into the stator due to winding 40 thereby making this pole appear as a south pole. It can be seen from FIGURE 2 that each alternate pole starting with the pole between *h* and *i* will appear to have no polarity. Starting with the pole between slots *g* and *h* a north pole is produced while every other pole around stator 15 will alternate in polarity. Since every other pole 16 on armature 15 has an alternate polarity it can be seen from FIGURE 3 that flux will flow only in armature poles 27 as designated by flux paths 50. In this instance there will be no flux paths 51. It should be noted that flux could be caused to flow only in armature poles 26 by changing the polarities on leads 31 and 30 or 41 and 42 and in this case only flux path 51 would be present. Because flux is flowing only in armature poles 27 a force will be produced tending to align poles 27 with poles 16. It can be seen in FIGURE 4 that this will cause armature 25 to shift to the left or in FIGURE 3 armature 25 will have a force causing it to shift into the paper.

Once coil 91 of relay 90 is deenergized voltage supplies 98 and 113 are removed from across windings 30 and 40 and the force is removed from armature element or inertial element 25. At the same time voltage supplies 98 and 113 are removed from windings 30 and 40 the normal pickoff circuit is established and windings 30 and 40 operate as a pickoff for armature element 25. When the force is removed from armature element 25 resilient diaphragms 20 and 21 cause armature element 25 to return to the null position. During this movement the position of the armature element is indicated by the amplitude of the pickoff output voltage. This output voltage appears between leads 80 and 81, and leads 121 and 122, and is indicated by indicating means 120.

FIGURE 6 is a drawing of the voltage waveform which would appear between leads 80 and 81 or leads 121 and 122. No waveform can be seen at the output during the torquing period since relay 90 completes circuits that short the output leads together and removes the alternating current excitation to the pickoff. Once the torque is removed from armature 25 and the alternating current excitation is reconnected to the pickoff by deenergizing relay 90, the springs 20 and 21 return armature 25 to the null position. However, as the armature 25 returns to the null position, the displacement causes a net voltage to be induced into the secondary winding 40 from primary winding 30 as has already been explained and the amplitude of the pickoff output voltage will indicate the position of the armature 25. This pickoff output voltage will be of the same frequency as voltage supply 60 and the frequency can be seen in FIGURE 6 when one cycle is depicted between a first point 130 and a second point 131. It can be seen that the peak at 130 is higher than the peak at 131. The reason for the reduction in size of the peaks is that the armature 25 is approaching closer to the null position and actually reaches the null position at point 133. Some type of damping means in the transducer 10, which in the present case is simply the mechanical resistance of springs 20 and 21, is necessary or the armature 25 would oscillate interminably and the transducer 10 would be useless. It is understood by those skilled in the art that in the usual transducer some separate type of damping is used such as eddy current or viscous fluid damping and the damping used in the present embodiment is used for simplification. The waveform in FIGURE 6 is slightly underdamped since the oscillations cross zero at point 133, rise to a smaller peak at point 134 and effectively stop at point 135, signifying that the armature 25 is a maximum distance from null at point 130, reaches null at 133, overshoots to a distance signified by the amplitude of the output signal at point 134 and returns to null at point 135. As can be seen the oscillations are practically damped out before the next torquing period.

By alternately applying a voltage to coil 91 and removing it a force can alternately be applied to and removed from armature member 25. The frequency with which the voltage is applied to coil 91 can be selected so that the voltage between output lead 80 and output lead 81 will be reduced to zero before the next force is applied to armature 25. That is, the length of time it requires for the output voltage to return to zero should be lower than the length of time between pulses applied to coil 91. Thus, by applying voltage pulses at a given frequency to coil 91 a repetitive voltage waveform will appear on indicating means 120. By analyzing this voltage waveform or by comparing this voltage waveform to a waveform taken from the same device when it was known to be operating correctly, an indication of the operation may be obtained. It should also be noted that a single output waveform from the pickoff could be analyzed but for convenience a repetitive method of observing the waveform has been explained.

One of the major advantages of the present device is that by simply disconnecting leads 99, 100, 102, 114, 117 and 119 the self-checking device can be disconnected from the electromagnetic transducer. Thus, once the transducer is checked and found to be operating properly the self-checking device may be removed and, thereby, no decrease in the reliability will prevail.

Thus, it can be seen that a quick efficient check of the transducer 10 can be made without upsetting the operation of the transducer and no additional internal parts are required. Also, the accuracy with which the damped voltage wave on the indicating means 120 is analyzed will be directly proportional to the accuracy with which the device may be checked out. That is, a very accurate or a very quick checkout device has been provided depending upon the use of the device.

While we have shown and described a specific embodiment of the invention, further modifications and improvements will occur to those skilled in the art. We desire therefore that this invention not be limited to the particular form shown and that the appended claim cover all modifications which do not depart from the spirit and scope of the invention.

What we claim is:

A fail-safe self-checking apparatus for an electromagnetic force transducer in which a magnetic element is mounted for displacement in response to a sensed condition and is biased to a normal null position by suitable restraining means, said transducer further having an induction pickoff comprising a primary winding normally energized from an A.C. source and a secondary winding both mounted adjacent said magnetic element, the displacement of said element causing a variation in the output from said secondary winding that corresponds to the amount and direction of movement of said element; said self-checking apparatus comprising:

(a) first and second D.C. sources;
    (b) indicating means;
    (c) circuit means for connecting said indicating means across said secondary winding;
    (d) a dummy load connected in series with said A.C. source and said primary winding;
    (e) first, second, third, and fourth simultaneously operated switching means each having a normally de-energized position and an energized position;
    (f) circuit means including said first switching means in the energized position for connecting said dummy load across said A.C. source to de-energize said primary winding;
    (g) circuit means including said second switching means in the energized position for connecting said first D.C. source to said primary winding;
    (h) circuit means including said third switching means in the energized position for connecting said second D.C. source to said secondary winding; and
(i) circuit means including said fourth switching means in the energized position for shorting out said indicating means; said switching means in the energized position thereby providing D.C. inputs to said de-energized primary and secondary windings to cause displacement of said magnetic element; said switching means in the de-energized position permitting normal operation of said force transducer whereby the displacement of said magnetic element is indicated by said indicating means.

References Cited by the Examiner
UNITED STATES PATENTS

| | | | |
|---|---|---|---|
| 1,755,117 | 4/1930 | Hildebrand | 73—1 X |
| 2,748,348 | 5/1956 | McCarter | 324—158 |
| 2,923,904 | 2/1960 | Hieber. | |
| 2,946,226 | 7/1960 | Wendt et al. | 73—517 |
| 2,947,176 | 8/1960 | Perry | 73—517 |
| 3,076,343 | 2/1963 | Dumas | 73—1 |
| 3,077,760 | 2/1963 | Packard | 73—1 |
| 3,122,926 | 3/1964 | Giers | 73—1 X |

ISAAC LISANN, *Primary Examiner.*